(12) United States Patent
Vorpahl

(10) Patent No.: US 11,559,865 B2
(45) Date of Patent: Jan. 24, 2023

(54) SCRAPER FOR SCRAPING A SURFACE OF A MACHINE TOOL HAVING A WEAR-INDICATING DEVICE

(71) Applicant: THODACON WERKZEUGMASCHINENSCHUTZ GMBH, Kolbermoor (DE)

(72) Inventor: Vincent C. Vorpahl, Rosenheim (DE)

(73) Assignee: THODACON WERKZEUGMASCHINENSCHUTZ GMBH, Kolbermoor (DE)

( * ) Notice: Subject to any disclaimer, the term of this patent is extended or adjusted under 35 U.S.C. 154(b) by 765 days.

(21) Appl. No.: 16/487,761

(22) PCT Filed: Feb. 21, 2018

(86) PCT No.: PCT/EP2018/054278
§ 371 (c)(1),
(2) Date: Aug. 21, 2019

(87) PCT Pub. No.: WO2018/153916
PCT Pub. Date: Aug. 30, 2018

(65) Prior Publication Data
US 2020/0047300 A1      Feb. 13, 2020

(30) Foreign Application Priority Data
Feb. 21, 2017   (DE) .......................... 102017103538.9

(51) Int. Cl.
*B23Q 11/08* (2006.01)
*B08B 1/00* (2006.01)
(Continued)

(52) U.S. Cl.
CPC .......... *B23Q 11/0875* (2013.01); *B08B 1/005* (2013.01); *B08B 13/00* (2013.01);
(Continued)

(58) Field of Classification Search
CPC .............. B23Q 11/0875; B23Q 17/007; B23Q 17/008; B23Q 11/0078; B23Q 11/00; B08B 1/005; B08B 13/00; F16J 15/3296
See application file for complete search history.

(56) References Cited

U.S. PATENT DOCUMENTS

| | | | |
|---|---|---|---|
| 3,429,356 A | | 2/1969 | Loos |
| 4,189,046 A | * | 2/1980 | Ward ..................... B65G 45/16 15/256.5 |

(Continued)

FOREIGN PATENT DOCUMENTS

| | | |
|---|---|---|
| CN | 201707040 U | 1/2011 |
| CN | 103234903 A | 8/2013 |

(Continued)

OTHER PUBLICATIONS

German Search Report for related German Application No. 102017103538.9; dated Oct. 17, 2017; 7 pages.
(Continued)

*Primary Examiner* — Erin F Bergner
(74) *Attorney, Agent, or Firm* — Dickinson Wright PLLC

(57) ABSTRACT

The present invention relates to a scraper (14) for scraping a surface of a machine tool having a wear-indicating device (18, 20, 24, 30) for the scraper lip (16) of the scraper. At least one signal line (18) is embedded in the scraper lip (16) in such a manner that, upon reaching the wear limit (G), at least one section of the signal line (18) is exposed.

9 Claims, 2 Drawing Sheets

(51) Int. Cl.
  *B08B 13/00* (2006.01)
  *B23Q 17/00* (2006.01)
  *F16J 15/3296* (2016.01)
(52) U.S. Cl.
  CPC ......... *B23Q 17/007* (2013.01); *B23Q 17/008* (2013.01); *F16J 15/3296* (2013.01)

(56) References Cited

U.S. PATENT DOCUMENTS

| | | |
|---|---|---|
| 4,424,973 A | 1/1984 | Heilala |
| 4,937,633 A | 6/1990 | Ewing |
| 6,615,639 B1 | 9/2003 | Heinzen |
| 2003/0230466 A1 | 12/2003 | Swinderman et al. |
| 2012/0267858 A1 | 10/2012 | Rust |

FOREIGN PATENT DOCUMENTS

| | | |
|---|---|---|
| CN | 204300201 U | 4/2015 |
| DE | 3304097 A1 | 8/1983 |
| DE | 3444175 C1 | 3/1986 |
| DE | 4406096 A1 | 9/1995 |
| DE | 19745734 A1 | 4/1999 |
| DE | 102004055714 A1 | 6/2006 |
| DE | 102007028579 A1 | 1/2008 |
| DE | 202008010087 U1 | 11/2008 |
| DE | 102008028110 A1 | 11/2009 |
| DE | 102008053710 A1 | 5/2010 |
| DE | 202009010190 U1 | 5/2010 |
| DE | 102011082574 A1 | 3/2013 |
| EP | 2182341 A2 | 5/2020 |
| WO | 2016091561 A1 | 6/2016 |

OTHER PUBLICATIONS

First Chinese Office Action, with English translation, dated Jun. 30, 2021 for Chinese Application No. 201880012960.6, 9 pages.
European Office Action dated Feb. 17, 2022 for European Application No. 18707013.1, 5 pages.

* cited by examiner

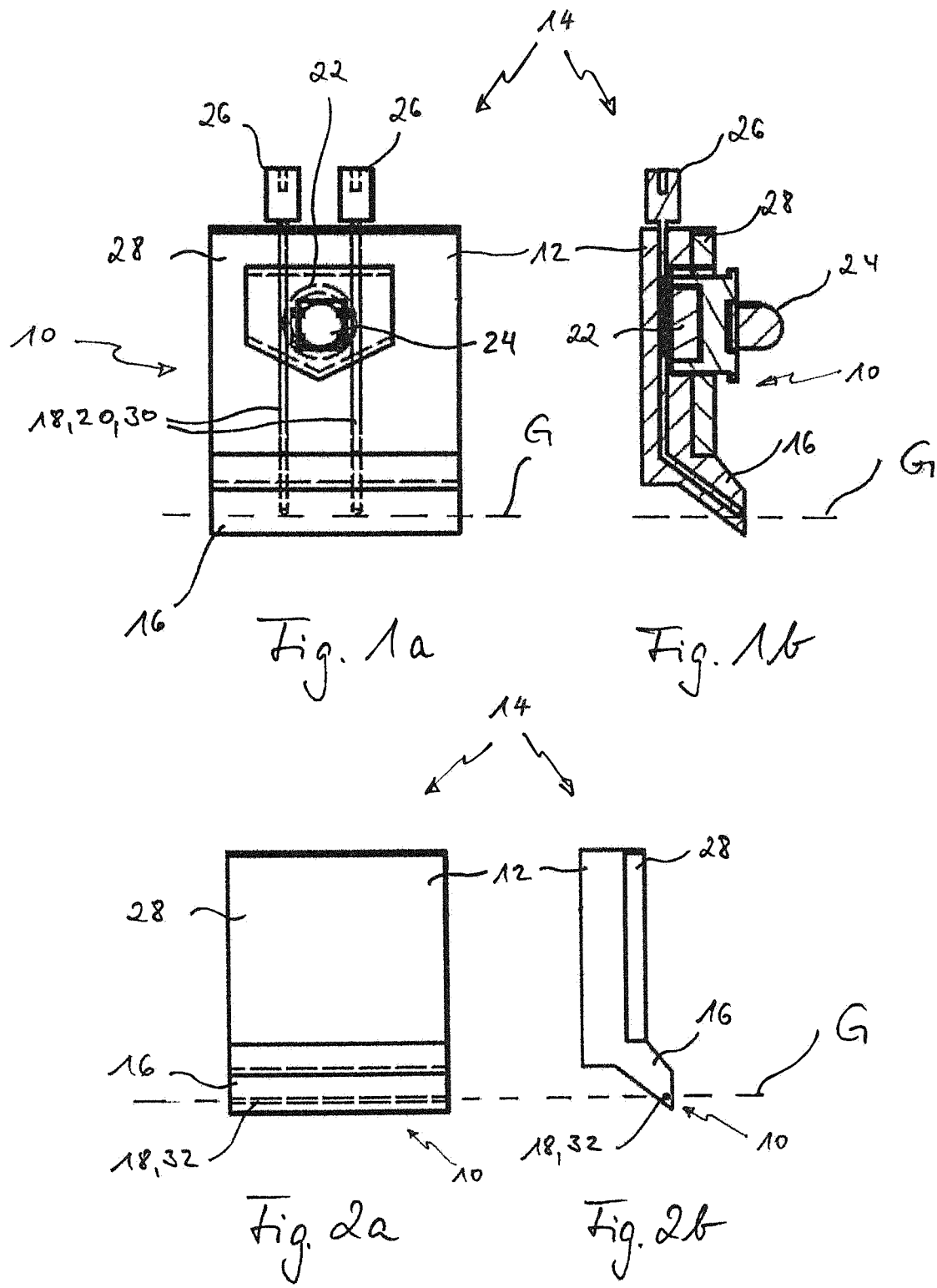

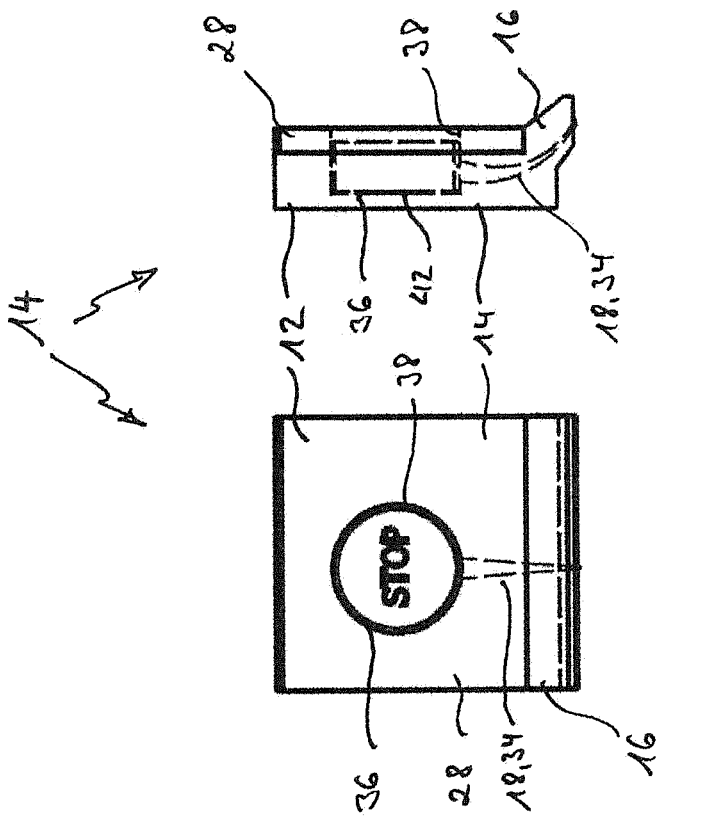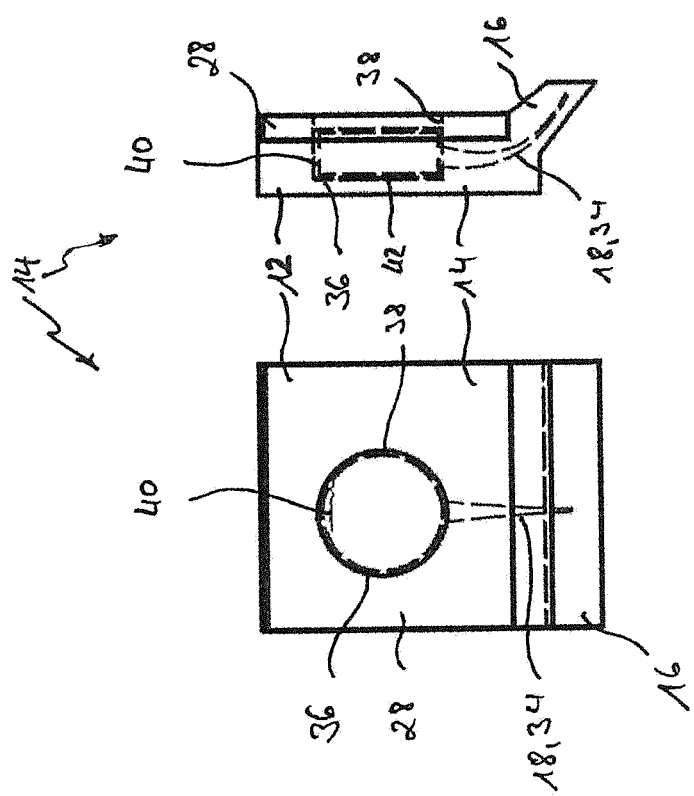

SCRAPER FOR SCRAPING A SURFACE OF A MACHINE TOOL HAVING A WEAR-INDICATING DEVICE

The present invention relates to a way wiper (or scraper) for wiping (or scraping) a surface of a machine tool that has a wear warning device for the way wiper lip of the way wiper.

Way wiper apparatus are, for example, used in modern machine tools to wipe coolant/lubricant from telescopic covers or apron way covers of the respective machine. The guide ways of such machine tools can equally be liberated from foreign bodies deposited thereon, such as chips or other contamination arising on the machining of metals, by means of such way wiper apparatus, that will also be called way wipers here, to prevent the guide ways from premature wear. Since the way wiper lip of such a way wiper apparatus contacts the guide way under a preload, the way wiper lip is, however, subject to not insubstantial wear and therefore has to be replaced from time to time. The way wiper lips of such way wiper apparatus can here have a complex geometry and in particular a polygonal boundary having a plurality of straight lip sections so that it can be difficult to keep an eye on the exact wear status of the individual lip sections.

It is therefore typically necessary to regularly inspect such way wiper lips of machine tool way wipers, that are subject to wear and that are typically produced from an elastomer material, with respect to their wear state to be able to replace them as necessary.

Since such routine inspections are in particular very time-consuming with larger production plants, it would therefore be desirable in the sense of the Industry 4.0 revolution to provide a way wiper for a machine tool that is suitable to automatically inform a machine operator of the wear state of the way wiper lip of the way wiper.

It is therefore the underlying object of the invention to meet this demand.

This object is satisfied by a way wiper for a machine tool having the features of claim 1 and in particular in that at least one signal line is embedded in the way wiper lip, i.e. is integrated in or is provided close to the surface of the elastomer material from which the way wiper lip is produced, such that at least a section of the signal line is exposed when the wear limit of the way wiper lip is reached.

If the signal line is, for example, an electrical conductor to which an electric potential is applied, no current flows through the signal line due to the fact that the signal line is embedded in the way wiper lip and is thus insulated. If, however, the wear limit of the way wiper lip is reached, which has the consequence that a section of the signal line is exposed and thus comes into contact with a conductive surface such as with a guide way of a machine tool to be wiped, an electric current flows through the signal line, which is a clear indication that the way wiper lip has probably reached its wear limit.

If such a signal current occurs, this can be brought to the attention of a machine operator by, for example, a lamp lighting up so that the machine operator can directly inspect the respective way wiper or its way wiper lips for wear and can replace it/them if required. It is thus not necessary to inspect all the way wipers of the machines of a production plant regularly with respect to their wear states since the reaching of the wear limit can be automatically brought to the attention of the machine operator.

Preferred embodiments of the invention will now be looked at in the following. Further embodiments can furthermore result from the dependent claims, from the description of the Figures, and from the Figures themselves.

Provision can thus be made in accordance with an embodiment that the at least one signal line is an electrical conductor of an electric circuit that is in particular fed with electrical energy from a battery such as a button cell that is preferably rechargeable. The respective way wiper therefore has its own voltage source so that the way wiper does not have to be connected to an external voltage source. Providing a battery as the voltage source can in particular be considered since conventional way wiper lips wear faster as a rule than a discharge of a correspondingly suitable battery can occur. Energy is thus only taken from the battery when the wear limit of the way wiper lip has been reached so that the battery can be used as a reliable voltage source up to this point in time apart from slight self-discharge processes.

Provision can be made in accordance with a further embodiment that the circuit includes an illuminant such as an LED. If a signal current occurs in the signal lime in the previously explained manner when the signal line is exposed and, for example, comes into conductive contact with a guide way of a machine tool, the illuminant lights up as a signal that the way wiper lip is worn, whereupon a replacement of the way wiper lip can immediately take place.

In accordance with a further embodiment, the illuminant can be provided at the way wiper lip or in the direct environment thereof, whereby which way wiper of a machine tool is worn and should be replaced can be directly signaled to a machine operator. A plurality of way wipers are thus namely frequently provided at a machine tool so that the machine operator can be informed directly by an LED provided in the direct environment of the respective way wiper which way wiper is specifically worn and should be replaced. The machine operator can thus already recognize from a distance for which machine a wear service is due and which way wiper should specifically be replaced. The wear warning device in accordance with the invention can thus also be used with machines that not have an interface to a remote control center.

In accordance with a further embodiment, the signal line can comprise two conductor sections that are each embedded in the way wiper lip such that at least one section of each conductor section is exposed on reaching the wear limit. If therefore the two conductor sections are at least partially exposed on reaching the wear limit of the way wiper lip, they come into conductive contact with an adjacent surface such as with a guide way of a machine tool to be wiped, whereupon a signal current flows between the two conductor sections that can make an illuminant light up.

So that the surface of the respective machine tool to be wiped or to be sealed cannot be scratched by the conductor sections when they contact the respective surface on reaching the wear limit, the conductor sections can comprise a soft material such as copper or brass.

In accordance with a further embodiment, the circuit can have an interface for connection and for signal transmission to a control device. The way wiper in accordance with the invention can, for example, be connected via such an interface to a remote control center to keep a machine operator advised of the wear state of the respective machine there. The machine operator thus does not need any visual contact with the respective machine tool since he can be advised of the wear state of the individual machines or of their way wiper lips in the control center via the interface of the wear warning device. An emergency stop of the respective machine can equally also be effected via the interface in the wear event in that a corresponding control signal is output to the control device of the machine or is read via the interface.

In accordance with a further embodiment, the at least one signal line can be a light conducting optical waveguide such as a fiber optic cable that preferably extends along the wear limit of the way wiper lip. If the wear limit of the way wiper lip is therefore reached at any point, this has the result that the optical waveguide is damaged or even interrupted, which has the consequence that a light signal transmitted by the optical waveguide before the reaching of the wear limit is interrupted or at least modified, which can be evaluated as a reaching of the wear limit.

In accordance with a further embodiment, an electrical conductor can also be used in a corresponding manner as a signal line that extends along the wear limit of the way wiper lip in the same. On reaching the wear limit, an electrical conductor extending along the wear limit in such a manner is interrupted, whereupon a signal current flowing in the electrical conductor up to that time is likewise interrupted, which can likewise be evaluated such that the wear limit has been reached.

In accordance with an even further embodiment, the at least one signal line can be a fluid line that is damaged on reaching the wear limit, whereupon a fluid in the fluid line leaves the same as a signal representative for the reaching of the wear limit.

In accordance with a further embodiment, the fluid line can thus, for example, be a component of a so-called glow stick, with the fluid line providing fluid communication with a fluid reservoir that is visibly attached to the way wiper lip and that contains a reaction fluid of the glow stick such as a liquid fluorescer. The fluid line can thus, for example, have a free end that defines the wear limit of the way wiper lip so that, in the event the wear limit is reached, the fluid line is subjected to a mechanical strain that has the effect that the glow stick is activated. For example, a glass vial filled with a hydrogen peroxide solution is present in the interior of the fluid line and breaks due to the mechanical strain on the fluid line on the reaching of the wear limit of the way wiper lip, whereupon the hydrogen peroxide solution is released and the fluid line climbs up to and into the fluid reservoir. The hydrogen peroxide solution mixes with the fluorescer there and reacts with it, whereupon a preferably colored light is emitted by the fluid reservoir and the fluid line as a signal representative for the reaching of the wear limit.

In accordance with an even further embodiment, the fluid line can establish a fluid communication with a transparent reservoir filled with a fluid that is preferably dark. If the fluid line is damaged in this case on the reaching of the wear limit of the way wiper lip, fluid located in the reservoir can exit through it or through the created leak, which can be evaluated as a signal that the wear limit of the way wiper lip has been reached. On the one hand, the machine operator can have his attention drawn to the wear limit having been reached by the exiting fluid itself. The reservoir can additionally have a colored background or can include a lettering such as the word "STOP" that is covered by the fluid in the reservoir so that the colored background and/or the word only come into view when the fluid exits the reservoir via the fluid line on reaching the wear limit. Since the word and/or the colored background of the fluid reservoir becomes visible, it is thus directly signaled to the machine operator that the wear limit has been reached and that the way wiper or its way wiper lip thus should be replaced.

Since the surfaces of machine tools to be wiped are frequently electrically conductive, wear warning devices are particularly suitable for machine tools in whose way wiper lip an electrical conductor is embedded since the circuit between the two conductor sections of the signal line can be closed by the surface to be wiped such as a guide way of a machine tool, whereupon an electric current flows through the signal line, which is an indication that the way wiper lip has probably reached its wear limit.

In accordance with a further embodiment, the signal line can be a pin embedded in the way wiper lip, or a kind of needle, that is successively pressed out of the way wiper lip on the reaching of the wear limit and thus becomes visible. If the pin or the needle is thus visible from the outside, a conclusion can be drawn that the wear limit has been reached.

In accordance with a further embodiment, the way wiper lip can have a complex geometry and in particular a polygonal boundary with a plurality of straight lip sections, with a section of the signal line being embedded in each lip section. Even if the individual lip sections of the way wiper lip should therefore wear at different levels, it can thereby be recognized in good time whether one of the lip sections has possibly reached its wear limit prematurely and before the other lip sections so that the total way wiper lip can then be replaced in good time.

The invention will now be described in the following purely by way of example with reference to the enclosed drawings, in which:

FIGS. 1a and 1b show a way wiper in accordance with the invention in accordance with a first embodiment in a view and in a cross-sectional representation;

FIGS. 2a and 2b show a way wiper in accordance with the invention in accordance with a second embodiment in a view and in a cross-sectional representation; and FIGS. 3a to 3d show a way wiper in accordance with the invention in accordance with a third embodiment in a view and in cross-sectional representations before and after reaching a wear limit.

A description is first made with reference to FIGS. 1a and 1b of a first embodiment of a way wiper 14 in accordance with the invention in which a signal line 18 in the form of an electrical conductor 20 having two conductor sections 30 is used as a wear warning device 10. The way wiper 14 here comprises a way wiper lip 16 that is fastened to a carrier 28 of the way wiper 14. The way wiper lip 16 and the carrier 28 here have a substantially straight, i.e. not curved, longitudinal extent and extend in parallel with a surface of a machine tool to be wiped, not shown here, that is not shown here for reasons of clarity, with the way wiper lip 16 contacting the surface to be wiped. To liberate the surface to be wiped of, for example, foreign bodies deposited thereon such as chips arising on the machining of metals or from other dirt, the way wiper 14 is moved linearly along the surface to be wiped perpendicular to its longitudinal extent. Since the way wiper lip 16 contacts the surface to be wiped under a preload in the process, the way wiper lip 16 is, however, subject to not insubstantial wear and therefore has to be replaced from time to time. To be able to recognize the wear state of the way wiper lip 16 at an early time, in accordance with the invention the way wiper has the wear warning device 16 by means of which the point in time can be determined at which the way wiper lip 16 reached its wear limit G.

For this purpose, two conductor sections 30, composed for example of copper or brass, of a current circuit are embedded in the way wiper lip 16 such that the wear limit G of the way wiper lip 16 is defined by its free ends, said way wiper lip 16 being able to be produced, for example, from nitrile rubber (NBR) or fluororubber (FPM or FKM) by means of a flow molding method or a compression molding method or also from a sealing substance such as felt. In other words, the free ends of the two conductor sections 30 are at the level of the wear limit G of the way wiper lip 16. The way wiper lip 16 can furthermore, for example, also be produced from other sealing materials such as PU, silicone, EPDM, or PTFE.

The wear warning device 10 furthermore has a battery 22, preferably rechargeable, in the form of a button cell via which an electric voltage potential can be applied to the two conductor sections 30. The circuit further comprises an illuminant in the form of an LED 28 that is here integrated in the carrier 28 in a manner visible from the outside.

In FIGS. 1a and 1b, the way wiper lip 16 does not show any wear so that the two conductor sections 30 are completely embedded in the way wiper lip 16. The two conductor sections 30 are thus insulated from one another so that no current can flow through the circuit formed by the conductor sections 30. If, however, the wear limit G is reached, the free ends of the two conductor sections 30 are exposed and thus come into contact with the surface that has to be wiped by means of the way wiper lip 16 and which can, for example, be a guide way of a machine tool. If the guide way is electrically conductive, this has the result that the circuit is closed and a signal current thus flows that results in the lighting up of the LED 24, which can also be perceived by a machine operator from a distance as a signal representative for the wear of the way wiper lip 16.

Since, however, there is not always visual contact to the respective machine tool and in particular to the individual way wipers 14 of such a machine tool, the circuit in the embodiment shown here has an interface in the form of two plugs 26 via which the wear warning device 10 can be monitored by a remote control center as to whether a signal flow is flowing in the circuit. The wear state of the way wiper 14 can thus be monitored from a remote control center via the interface in the form of the two plugs 26. Furthermore, data on the wear status can also be transmitted via the interface in question to a server or to another data collection center from where they can be electronically transmitted directly to the manufacturer of the wear warning device 10 to, for example, initiate an early spare parts delivery.

Additionally or alternatively to this, a link of the wear warning device 10 to a control device of the machine tool can take place via the interface so that the machine can be directly switched off by the control device as soon as the wear limit G is reached.

Unlike the embodiment shown with two conductor sections 30, only one such conductor section 30 can also be embedded in the way wiper lip 16 if the surface to be wiped, which can, for example, be a guide way of a machine tool, is grounded. If in this case an electric potential is applied to the one conductor section 30, no current flows through the conductor section 30 for so long as the free end of the conductor section 30 is completely embedded in the way wiper lip 16. However, as soon as the free end of the conductor section 30 is exposed due to wear and comes into conductive contact with the guide way of the machine tool, the potential applied to the conductor section 30 effects a current through the conductor section 30 that results in the lighting up of the LED 24, which can also be perceived by a machine operator from a distance as a signal representative for the wear of the way wiper lip 16.

In the following, a second embodiment of a way wiper 14 in accordance with the invention will be described with reference to FIGS. 2a and 2b in which an optical waveguide 32 is used as the signal line 18. The optical waveguide 32 can, for example, be a fiber optic cable that extends in parallel with or along the wear limit G. The signal line 18 in the form of the optical waveguide 32 therefore again also defines the wear limit G in this embodiment.

If in this embodiment the way wiper lip 16 is successively removed regionally due to wear, damage to or an interruption of the optical waveguide 32 occurs in this region so that the light transmission by the optical waveguide 32 is interrupted or is at least modified when the optical waveguide 32 is only slightly damaged externally since in this case the light rays are differently reflected in this region than previously. Such an interruption or modification of the light transmission by the optical waveguide 32 can be detected, for example, by a light sensor so that on an interruption or modification of the light transmission, a conclusion can be drawn that the wear limit G has been reached and the way wiper 14 or its lip 16 should be replaced.

Instead of providing an optical waveguide 32 in parallel with or along the wear limit G embedded in the way wiper 14 or its way wiper lip 16 in the embodiment described with reference to FIGS. 2a and 2b, an electrical conductor that is live for as long as the wear limit G has not been reached can be embedded in the way wiper 14 or in the way wiper lip 16 along the wear limit G. If, however, the wear limit G is reached and if the electrical conductor is damaged in this process, the current is interrupted, from which it can be concluded that the wear limit G has been reached.

Provision can furthermore be made in accordance with a further embodiment to embed a free end of an optical waveguide in the way wiper 14 such that the free end of the optical waveguide is exposed on reaching the wear limit G of the way wiper 14. Light fed into the optical waveguide thus does not exit the free end of the optical waveguide for so long as the wear limit G is not reached. However, as soon as the wear limit G is reached, the light fed into the optical waveguide exits at the free end thereof, which can in turn, for example, be detected by means of a light sensor to conclude that the way wiper is worn.

A third embodiment of a way wiper 14 will now be described in the following with reference to FIGS. 3a to 3d in which a fluid line 34 is used as the signal line 18. As can be seen from FIGS. 3a to 3d, the fluid line 34 embedded in the way wiper lip 16 has a free end by which the wear limit G is defined. At its oppositely disposed end, the fluid line 34 opens into a transparent reservoir 36 that is likewise partially embedded in the way wiper 14 and is visible from the outside through an inspection window 38 in the carrier 28. The reservoir 36 and the fluid line 34 are filled with a fluid 40 that is preferably dark colored and by which a "STOP" word is covered that is provided at a rear wall 42 of the reservoir 36 disposed opposite the inspection window 38.

The wear limit G of the way wiper 14 has not yet been reached in FIGS. 3a and 3b. The free end of the fluid line 34 is thus completely embedded in the way wiper lip 16 so that no fluid 40 can exit the free end of the fluid line 34. If, however, the way wiper lip 16 of the way wiper 14 has been successively removed due to wear, the free end of the fluid line 34 is free in accordance with FIGS. 3c and 3d as soon as the wear limit G has been reached. Since the fluid line 34 is in fluid communication with the reservoir 36, fluid present in the reservoir 36 can thus exit through the free end of the fluid line 34 so that the fluid level in the reservoir 36 drops with the consequence that the "STOP" word becomes visible. A machine operator is thus informed by the appearance of the "STOP" word that the way wiper 14 is worn and should be replaced.

Additionally or alternatively to the "STOP" word, the rear wall 42 of the reservoir can also be configured as colored, for example in the color red, to make the reaching of the wear limit even more visible.

REFERENCE NUMERAL LIST

10 wear warning device
14 way wiper
16 way wiper lip
18 signal line
20 electrical conductor
22 battery/button cell
24 LED
26 plug/interface
28 carrier
30 conductor sections
32 optical waveguide
34 fluid line
36 reservoir
38 inspection window
40 fluid
42 rear wall
G wear limit

What is claimed is:

1. A way wiper for wiping a surface of a machine tool comprising:
    a way wiper lip subject to wear for wiping the surface of the machine tool, wherein the way wiper lip defines a wear limit; and
    at least one signal line,
    wherein the at least one signal line is embedded in the way wiper lip such that at least one section of the signal line is exposed on reaching the wear limit,
    wherein the at least one signal line is a fluid line,
    wherein the fluid line is a component of a glow stick, with the fluid line providing fluid communication with a fluid reservoir that is visibly attached to the way wiper lip and that contains a reaction fluid of the glow stick.

2. The way wiper in accordance with claim 1, wherein the fluid line establishes fluid communication with a reservoir that is filled with the reaction fluid.

3. The way wiper in accordance with claim 2, wherein at least a portion of the reservoir is transparent.

4. The way wiper in accordance with claim 1, wherein the reaction fluid is a liquid fluorescer.

5. The way wiper in accordance with claim 1, wherein the signal line defines the wear limit of the way wiper lip.

6. The way wiper in accordance with claim 5, wherein the signal line defines the wear limit of the way wiper lip, for which purpose the signal line has a free end that defines the wear limit.

7. The way wiper in accordance with claim 5, wherein the signal line defines the wear limit of the way wiper lip, for which purpose the signal line extends in parallel with the wear limit.

8. The way wiper in accordance with claim 1, wherein the way wiper lip has a polygonal boundary.

9. The way wiper in accordance with claim 8, wherein the polygonal boundary has a plurality of straight lip sections, with a section of the signal line being embedded in each lip section.

\* \* \* \* \*